United States Patent [19]

Randall et al.

[11] 3,726,941
[45] Apr. 10, 1973

[54] CONTROL OF REACTION TEMPERATURE IN A PLURALITY OF ALKYLATION REACTORS

[75] Inventors: John H. Randall; Oliver P. Proctor, both of Bartlesville, Okla.

[73] Assignee: Phillips Petroleum Company, Bartlesville, Okla.

[22] Filed: Feb. 22, 1971

[21] Appl. No.: 117,384

[52] U.S. Cl............................................260/683.57
[51] Int. Cl...............................................C07c 3/56
[58] Field of Search....................260/683.47, 683.53, 260/683.57, 683.43, 683.64, 683.45

[56] References Cited

UNITED STATES PATENTS

| 2,438,852 | 3/1948 | Goldsby et al. | 260/683.47 |
| R22,146 | 7/1942 | Goldsby et al. | 260/683.57 |
| 2,843,144 | 7/1958 | Robinson et al. | 260/683.57 |

Primary Examiner—Delbert E. Gantz
Assistant Examiner—G. J. Crasanakis
Attorney—Young and Quigg

[57] ABSTRACT

In an alkylation process reacting an isoparaffin and an olefin using a metal halide catalyst, such as isobutane and ethylene in the presence of aluminum chloride complex type catalyst, the catalyst is recovered and recycled as catalyst and as the cooling agent to control the temperature of reaction in a reaction zone. In one embodiment the recovered catalyst is precooled before recycle to a reaction zone, thus reducing the amount of recycle material required for control of reaction temperature. In another embodiment the effluent from a first reaction zone is cooled prior to being fed with fresh olefin feed and recycle isobutane into a second reaction zone. In another embodiment, the fresh isoparaffin feed is mixed with the recovered catalyst before it is cooled for recycle to reduce the viscosity of the stream and improve heat exchange efficiency.

5 Claims, 1 Drawing Figure

PATENTED APR 10 1973
3,726,941
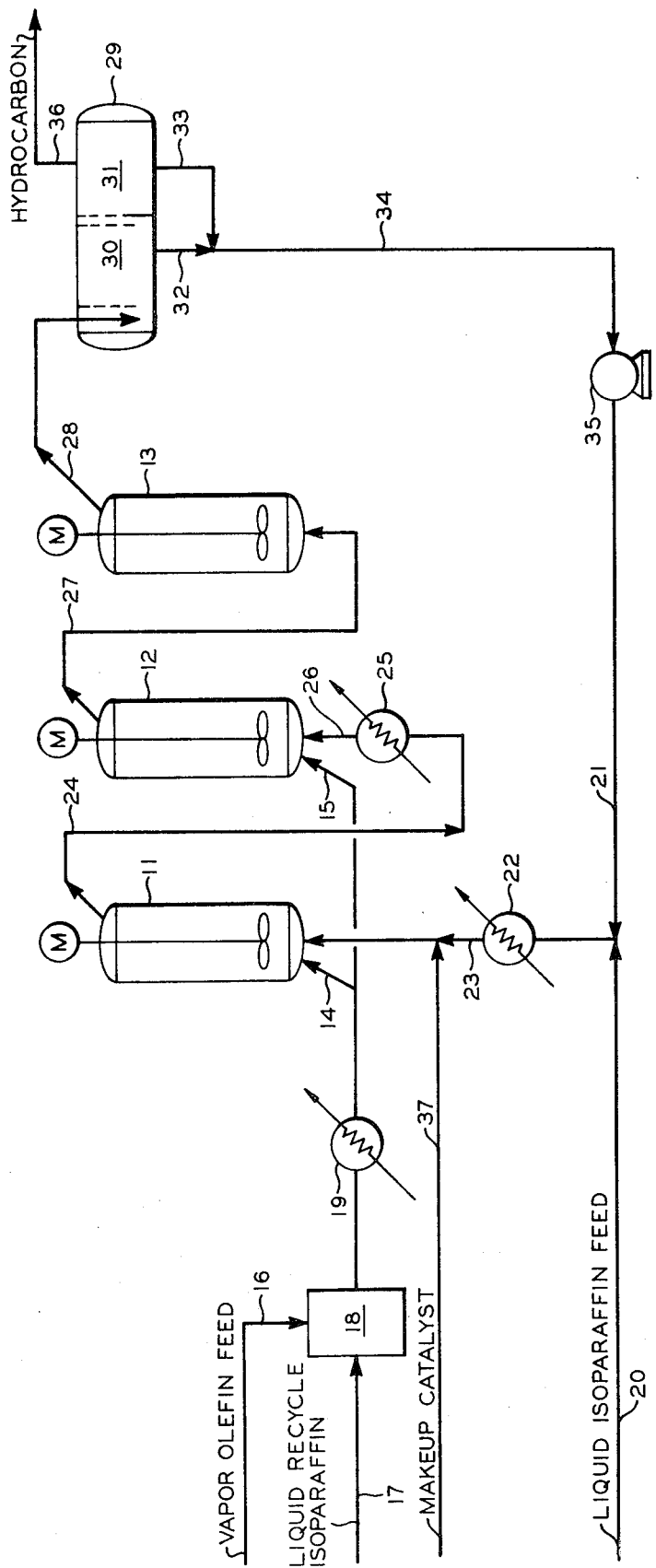
INVENTOR.
J. H. RANDALL
O. P. PROCTOR
BY
*Young and Quigg*
ATTORNEYS

CONTROL OF REACTION TEMPERATURE IN A PLURALITY OF ALKYLATION REACTORS

BACKGROUND OF THE INVENTION

This invention relates to the alkylation of hydrocarbons. In one of its aspects, it relates to the control of reaction temperature in an alkylation reaction. In another of its aspects, this invention relates to the alkylation of an isoparaffin with an olefin in the presence of a catalyst in a plurality of reactors. In another of its aspects, it relates to the recovery and the recycling of a catalyst stream.

In one of its concepts, this invention relates to removal of heat of reaction in an alkylation reaction by recycle of recovered catalyst. In another of its concepts, this invention relates to reducing the amount of catalyst recycle necessary for heat removal in an alkylation reaction by cooling the recycled catalyst. In another of the concepts of this invention, it relates to improving the efficiency of cooling the recycled catalyst stream by adding fresh isoparaffin reaction feed to the recycle catalyst stream to reduce the viscosity of the recycle catalyst before the indirect cooling of the catalyst is effected. In another concept of this invention, it relates to reducing the heat load in an alkylation reacting zone by adding a vapor feed stream to a liquid feed stream with cooling before entering the reaction zone.

The reaction of an isoparaffin and an olefin in the presence of a metal halide catalyst complex is well known. Many methods and apparati have been proposed for carrying out the reaction. These methods depend on removing heat to control the alkylation reactions by recycling to the reactor system alkylated product material which was produced in the reactors and from which the catalyst has been removed. A major objection to such an operation is that recycling a reaction product allows secondary alkylation or other reactions which tend to degrade the product quality, e.g., to reduce the octane number of the product.

It is therefore an object of this invention to provide a process for the controlled alkylation of an isoparaffin and an olefin in the presence of a metal halide catalyst. It is another object of this invention to provide a method for controlling the temperature of reaction in the alkylation of an isoparaffin and an olefin in the presence of a metal halide type catalyst while maintaining high quality of the products produced. It is another object of this invention to provide a method for controlling the temperature of reaction in the alkylation of an isoparaffin and an olefin by recycling a process stream. It is still another object of this invention to provide methods for minimizing the necessary recycle of process material with cooling of the recycle stream, using an external source of indirect cooling.

Other aspects, concepts and objects of the invention are apparent from a study of this disclosure, the drawing and the appended claims.

SUMMARY OF THE INVENTION

According to the present invention a process for alkylation is provided which comprises contacting in a reaction zone under alkylation conditions, an isoparaffin with an olefin in the presence of a metal halide complex liquid alkylation catalyst wherein the catalyst comprises fresh catalyst and an amount of recovered alkylation catalyst sufficient to control the temperature of reaction in the reaction zone below a predetermined maximum; separating reaction zone effluent into a recovered alkylation catalyst phase and a hydrocarbon phase containing alkylation product and unreacted feed material; and recycling to the reaction zone an amount of the recovered alkylation catalyst phase at least sufficient to establish an upper limit for the temperature of reaction in the reaction zone.

In one embodiment of the present invention there is provided a process for alkylation which comprises contacting in a first reaction zone, to form alkylate product, an isoparaffin with an olefin under alkylation conditions in the presence of an aluminum halide hydrocarbon complex liquid alkylation catalyst in an amount of alkylation catalyst sufficient at the proper temperature to limit the temperature of the reaction; contacting in a second reaction zone to form additional alkylate product, additional amounts of the isoparaffin and the olefin with the effluent of the first reaction zone wherein the effluent from the first reaction zone has first been cooled by indirect heat exchange sufficiently before entering the second reaction zone to limit the reaction temperature of the second reaction zone; proportioning the amount of reactants to each reaction zone as the controlling factor for the reaction temperatures; continuing contact of the effluent from the second reaction zone in a third reaction zone to substantially complete the alkylation reaction of olefin with isoparaffin; separating the third reaction zone effluent into a recovered aluminum halide hydrocarbon complex liquid catalyst phase and a hydrocarbon liquid phase containing alkylate product and unreacted feed material; and recycling to the first reaction zone an amount of the recovered catalyst sufficient to limit the temperature of reaction in the reaction zones.

In an embodiment of this invention, the catalyst recovered from the reaction zone effluent is recycled through an indirect heat exchange cooler before being fed to the first reaction zone. Cooling this recycle catalyst stream reduces the amount of recycle material necessary to limit the temperature of reaction in the reaction zones.

In another embodiment, the effluent (catalyst and product) from the first reaction zone is cooled by indirect heat exchange to further reduce the amount of recycle material necessary in limiting the temperature in the reaction zones.

In another embodiment of this invention, fresh isoparaffin feed is added to the recycle catalyst stream before this stream is cooled by indirect heat exchange. This step reduces the viscosity in the recycle catalyst stream thereby increasing the heat transfer efficiency during the cooling of this stream.

In another embodiment of this invention, recycled liquid isoparaffin is mixed with the olefin vapor feed and passed through a cooler before being fed to a reaction zone. This improves the mixing of these streams and removes the heat of solution of the olefin vapor thereby reducing by an equivalent amount the heat load in the reaction zone where the dissolving of the olefin vapor has conventionally taken place.

The metal halide catalysts presently preferred in the operation of this invention are those known to the art such as an aluminum chloride-hydrocarbon complex which can be activated with a hydrogen halide, for example, hydrogen chloride. The method of this invention can be operated with any liquid or slurried catalyst which is physically separable from the alkylate-hydrocarbon reaction product.

That operation of this invention is now preferred in which isobutane and ethylene are reacted in the presence of a metal halide alkylation catalyst to form alkylate product. However, various paraffins and olefins and mixtures thereof can be effectively reacted by the process of this invention to form alkylate product. Some suitable paraffin-olefin reactants are: Isobutane, isopentane, ethylene, propylene, and butylenes in various combinations.

DESCRIPTION OF THE DRAWING

The Drawing shows a multiple reaction system for the alkylation of an isoparaffin and an olefin in the presence of a halide catalyst in which the reaction temperature is limited by recycling liquid catalyst which has been recovered from the process system and has been cooled by indirect heat exchange, by cooling the first reactor effluent (catalyst and products) before using it as a feed for the second reactor, and by precooling the combined recycle isoparaffin-olefin vapor feed stream before entry to the reactors.

Referring now to the Drawing, the typical reaction system consists of three stirred reactors through which the liquid catalyst and fresh liquid isoparaffin feed flow together in series and into the first two of which an olefin and recycle isoparaffin stream is fed in parallel. Into a first reaction zone 11 is fed a precooled mixture of olefin vapor and recycle isoparaffin liquid feed, and a precooled mixture of fresh isoparaffin liquid feed and recycle catalyst stream. In the preferred embodiment of this invention olefin vapor and liquid isoparaffin recycled material are fed through line 16 and line 17, respectively, into a mixer 18 and then into a cooler 19 to cool the liquid isoparaffin recycle stream and remove the heat of solution of the olefin vapor. The mixed feed stream from the cooler 19 is divided into parallel flows 14 and 15 to the first reaction zone 11 and the second reaction zone 12. The fresh isoparaffin liquid feed stream 20 is fed into the liquid catalyst recycle stream 21 before the precooler 22 so that the viscosity of the catalyst stream is reduced for better cooling by indirect heat exchange. This mixture is fed through line 23 into the first reaction zone 11. The amount and temperature of recycle catalyst-isoparaffin mixture are such as to provide the cooling necessary to remove the heat of reaction in the first reaction zone. All of the reactor effluent from the first reaction zone 11 passes through line 24, into cooler 25, and through line 26 into the second reaction zone 12 into which is also fed through line 15 a portion of the precooled mixture of olefin and recycled isoparaffin. In the cooler 25 the effluent 24 from the first reaction zone is provided with sufficient cooling to remove the heat of reaction in the second reaction zone 12 and third reaction zone 13; effluent from the second reaction zone 12 passes through line 27 into the third reaction zone 13 where the alkylation reaction is completed to the desired extent of conversion and selectivity. The proportions of the olefin-recycle isoparaffin stream fed to the first and second reaction zones are adjusted to maintain control of the reaction temperatures in the reaction zones. Third reaction zone effluent passes through line 28 into a catalyst settling apparatus 29. This catalyst settler may be divided into a plurality of settling zones 30 and 31. From the settling zone an effluent of liquid hydrocarbon material containing the alkylation product and unreacted isoparaffin material is fed to a conventional recovery system (not shown) through line 36. The liquid catalyst recovered in the settling zones 30 and 31 is returned by way of lines 32, 33, 34, pump 35, and line 21 to be admixed with fresh isoparaffin feed from line 20 and cooled in the precooler 22 before being fed through line 23 into the first reaction zone 11. Makeup catalyst is introduced into the system by way of conduit 37.

The following examples show typical operation of both an alkylation reaction in which the hydrocarbon product is recycled as coolant for the reaction and alkylation reactions in which catalyst is recovered and recycled as coolant for the reaction.

EXAMPLE I

In a typical reaction to form an alkylate product by contacting an olefin and isobutane in the presence of a metal halide alkylation catalyst 3,570 barrels per day of olefins (contains 46.5 vol. percent ethylene, 15.5 vol. percent propylene, and 38.0 vol. percent isobutane) and 9,285 barrels per day of fresh (or makeup) and recycle isobutane are fed into a double reactor system. 9,285 barrels of the isobutane and 2,380 barrels per day of this olefin feed, which is a 3 to 1 volume mixture of ethylene to propylene, are fed to the first reactor along with approximately 40,000 barrels per day of recycled catalyst and 80,000 barrels per day hydrocarbon effluent recycle. The hydrocarbon effluent recycle has been cooled to 117° F and is used as coolant for the reaction process. The combined effluent exits the first reactor at a temperature of 123° F. This effluent along with 1,190 barrels per day of this olefin is fed to the second reactor. The effluent from the second rector is discharged at a temperature of 125° F. The catalyst is separated from this effluent and recycled to the reaction leaving approximately 91,900 barrels per day of hydrocarbon effluent product, 80,000 per day of which is cooled and recycled to the reaction as coolant and 11,900 net barrels per day of which is fractionated to obtain the desired product alkylate and recycle streams. Total alkylate produced was 2,300 barrels per day of 96.1 Research Octane No. (no tetraethyl lead).

EXAMPLE II 3,200 barrels per day of ethylene and 49,627 barrels per day of isobutane (45,513 barrels of recycle isobutane and 4,114 barrels of makeup or feed isobutane) are fed into a triple reactor system in the presence of a metal halide alkylation catalyst to produce an alkylate product. The makeup isobutane (4,114 B/D) is mixed with 53,000 barrels per day of recycled catalyst, passed through a cooler to reduce the temperature to 100° F, and is fed to the first reactor. The ethylene feed is mixed with 45,513 barrels per day of recycled isobutane cooled to 100° F and approximately one half of the mixture is fed to the first reactor. The effluent from the first reactor, at 125° F, is passed through a cooler to reduce the temperature to 100° F. This cooled effluent along with the remaining approximately half of the ethylene and recycled isobutane is fed to the second reactor. The effluent leaves the second reactor at a temperature of 120° F and is fed directly to a third reactor from which the effluent exits at 125° F. The catalyst is separated from this effluent to be recycled leaving approximately 51,000 barrels per day of hydrocarbon to be fractionated to recover the desired product alkylate and recycle streams. No total hydrocarbon effluent is recycled as in Example I. 5,000 barrels per day of 102.5 Research Octane Number (no tetraethyl lead) is produced.

These examples point out that an alkylate product can be produced without recycle of the total hydrocarbon reactor effluent (which has alkylate therein) as cooling agent for the reaction. This avoids degradation of the alkylate product by secondary alkylation. In both examples, the catalyst is the conventional aluminum chloride-hydrocarbon complex, well known in the art.

EXAMPLE III

In a material balance it was determined that approximately 105,000 barrels per day of catalyst must be recovered, cooled by single stage cooling to 100° F, and recycled to limit the reaction temperature to 125° F at the reaction rate of Example II. This is a catalyst to total hydrocarbon ratio of 2:1. This should be compared with a catalyst to total hydrocarbon ratio of 1:1 employed in one embodiment of this invention and as shown in the Example II using intermediate (two stage) cooling to reduce the total amount of recycle catalyst required to about 53,000 barrels per day with limiting of the reaction temperature to 125° F.

Reasonable variation and modification are possible within the scope of the foregoing disclosure, the drawing and the appended claims to the invention, the essence of which is that there has been provided a method for controlling the reacting temperature of the alkylation of an isoparaffin and an olefin in the presence of a metal halide catalyst by recycling recovered catalyst as a cooling agent. In further embodiments of the invention methods for reducing the amount of catalyst recycled as coolant are set forth and described.

We claim:

1. An alkylation process which comprises (a) contacting in a first reaction zone to form alkylate product, an isoparaffin with an olefin under alkylation conditions in the presence of a aluminum halide hydrocarbon complex alkylation catalyst comprising fresh catalyst and recovered alkylation catalyst, (b) controlling the amount and temperature of the total alkylation catalyst combining both fresh catalyst and recovered alkylation catalyst to limit the temperature of reaction to a maximum of 125° F in said first reaction zone; (c) contacting in a second reaction zone to form an alkylate product, additional amounts of said isoparaffin and said olefin with the effluent of said first reaction zone wherein said first reaction zone effluent has been cooled sufficiently before entering said second reaction zone to limit the reaction temperature of the second reaction zone to a maximum of 125° F; (d) proportioning said olefin and said isoparaffin between the first and the second reaction zones to produce an alkylation of controlled reaction temperature of 125° F maximum in each of the reaction zones; (e) continuing contact of the constituents of the effluent of said second reaction zone in a third reaction zone to form an alkylate product wherein the reaction of olefin which has been fed into the system is essentially completed at a maximum reaction temperature of 125° F; (f) separating the third reaction effluent into a recovered aluminum halide-hydrocarbon complex alkylation catalyst phase and a hydrocarbon phase containing alkylate product and unreacted isoparaffin feed material; and (g) recycling to said first reaction zone an amount of said alkylation catalyst at a temperature sufficient to limit the temperature of said total alkylation catalyst to said first reaction zone.

2. The process of claim 1 wherein said alkylation catalyst has been recycled through a cooler before being fed to said first reaction zone thereby reducing the amount of recycle required to limit the reaction temperature.

3. The process of claim 1 wherein fresh isoparaffin feed is added to said alkylation catalyst before it is cooled whereby said recycled catalyst is made less viscous.

4. The process of claim 1 wherein recycled isoparaffin is mixed with an olefin feed and cooled before being fed through a reaction zone.

5. The process of claim 1 wherein said isoparaffin is isobutane, and said olefin is ethylene.

* * * * *